United States Patent
Loomis et al.

(10) Patent No.: US 9,691,351 B2
(45) Date of Patent: Jun. 27, 2017

(54) SIMULATION OF DIFFUSIVE SURFACES USING DIRECTIONALLY-BIASED DISPLAYS

(71) Applicant: Google Inc., Mountain View, CA (US)

(72) Inventors: Nicholas C. Loomis, Oakland, CA (US); Colin Braley, Mountain View, CA (US); Behnam Bastani, San Jose, CA (US)

(73) Assignee: X Development LLC, Mountain View, CA (US)

( * ) Notice: Subject to any disclaimer, the term of this patent is extended or adjusted under 35 U.S.C. 154(b) by 303 days.

(21) Appl. No.: 14/493,752

(22) Filed: Sep. 23, 2014

(65) Prior Publication Data

US 2016/0086575 A1    Mar. 24, 2016

(51) Int. Cl.
G09G 5/10 (2006.01)
G06K 9/00 (2006.01)

(52) U.S. Cl.
CPC .......... *G09G 5/10* (2013.01); *G06K 9/00597* (2013.01); *G09G 2320/028* (2013.01); *G09G 2320/0261* (2013.01); *G09G 2320/068* (2013.01); *G09G 2320/0626* (2013.01)

(58) Field of Classification Search
None
See application file for complete search history.

(56) References Cited

U.S. PATENT DOCUMENTS

| | | | |
|---|---|---|---|
| 7,059,131 B2 | 6/2006 | Hildebrand | |
| 8,154,582 B2 | 4/2012 | Border et al. | |
| 8,731,322 B2 | 5/2014 | Lee | |
| 2004/0070565 A1 | 4/2004 | Nayar et al. | |
| 2007/0070092 A1 | 3/2007 | Oh et al. | |
| 2007/0103583 A1 | 5/2007 | Burnett et al. | |
| 2007/0103599 A1 | 5/2007 | Wen-Chin | |

(Continued)

FOREIGN PATENT DOCUMENTS

| | | |
|---|---|---|
| JP | 2009-284276 A | 12/2009 |
| KR | 10-2008-0097870 A | 11/2008 |
| WO | WO 2005-033776 A1 | 4/2005 |

OTHER PUBLICATIONS

Li, Baoxin, et al. "P-27: Adaptive Display Color Correction Based on Real-time Viewing Angle Estimation." SID Symposium Digest of Technical Papers. vol. 35. No. 1. Blackwell Publishing Ltd, 2004.*

(Continued)

*Primary Examiner* — Vu Nguyen
(74) *Attorney, Agent, or Firm* — Blakey Sokoloff Taylor & Zafman LLP

(57) ABSTRACT

Embodiments of a process including determining a position of an observer relative to a pixel array positioned on a diffuse surface, the pixel array comprising a plurality of individual display pixels, determining the observer's viewing angle relative to the pixel array based on the position of the observer relative to the pixel array, and adjusting the brightness of the pixel array so that the brightness of the pixel array when viewed at the observer's viewing angle substantially matches the brightness of the diffuse surface when viewed at the observer's viewing angle. Other embodiments are disclosed and claimed.

20 Claims, 6 Drawing Sheets

(56) References Cited

U.S. PATENT DOCUMENTS

2008/0158239 A1 7/2008 Lamy et al.
2010/0315414 A1 12/2010 Lowe

OTHER PUBLICATIONS

PCT/US2015/045757—PCT International Search Report and Written Opinion, mail date Dec. 7, 2015, 9 pages.
PCT/US2015/045757—PCT International Preliminary Report on Patentability, mail date Apr. 6, 2017, 6 pages.

* cited by examiner

SIMULATION OF DIFFUSIVE SURFACES USING DIRECTIONALLY-BIASED DISPLAYS

TECHNICAL FIELD

The disclosed embodiments relate generally to displays and in particular, but not exclusively, to directionally-biased displays that can be used to simulate diffuse surfaces.

BACKGROUND

Electronic displays are normally designed to have high brightness when viewed head-on or from the sides. Some displays, like televisions, have wide viewing angles to accommodate large audiences; these displays appear bright even when viewed at a large viewing angle. Others, like laptop screens, have a narrower viewing angle: when the display is viewed head-on it is bright, but if viewed from an angle it becomes dark. This increases power efficiency. By contrast, diffuse surfaces like paper, painted walls, fabric scraps, or many natural objects have a nearly uniform brightness over all viewing angles, and no sharp change in intensity or character is noticeable when the viewing angle of such surfaces is changed.

Electronic displays are commonly mounted on diffuse surfaces. But if an electronic display is meant to mimic a natural object, like being a seamless part of a wall or replacing a photograph, it should have the same brightness at each viewing angle as the natural object. Otherwise at certain viewing angles it becomes a virtual "hole," a dark and visually distracting rectangle on the diffuse background.

BRIEF DESCRIPTION OF THE DRAWINGS

Non-limiting and non-exhaustive embodiments are described with reference to the following figures, wherein like reference numerals refer to like parts throughout the figures unless otherwise specified.

DETAILED DESCRIPTION OF THE ILLUSTRATED EMBODIMENTS

Embodiments are described of an apparatus and method for directionally-biased displays that can be used to simulate diffuse surfaces. Specific details are described to provide a thorough understanding of the embodiments, but one skilled in the relevant art will recognize, based on the description, that the invention can be practiced without one or more of the described details or with other methods, components, materials, etc. In some instances well-known structures, materials, or operations are not shown or described in detail but are nonetheless within the scope of the invention.

References throughout this description to "one embodiment" or "an embodiment" mean that a described feature, structure, or characteristic can be included in at least one described embodiment, so that appearances of "in one embodiment" or "in an embodiment" do not necessarily all refer to the same embodiment. Furthermore, the described features, structures, or characteristics can be combined in any suitable manner in one or more other embodiments.

Embodiments of this invention seek to overcome the appearance of a display as a "hole" by using information about the viewer's position, the display's output, and the surface whose brightness it is trying to replicate to simulate the correct brightness. The resulting display takes on more natural qualities, integrates much better with the rest of the world, and reduces situations where the display appears as a lifeless hole in the wall.

Figure 1A:
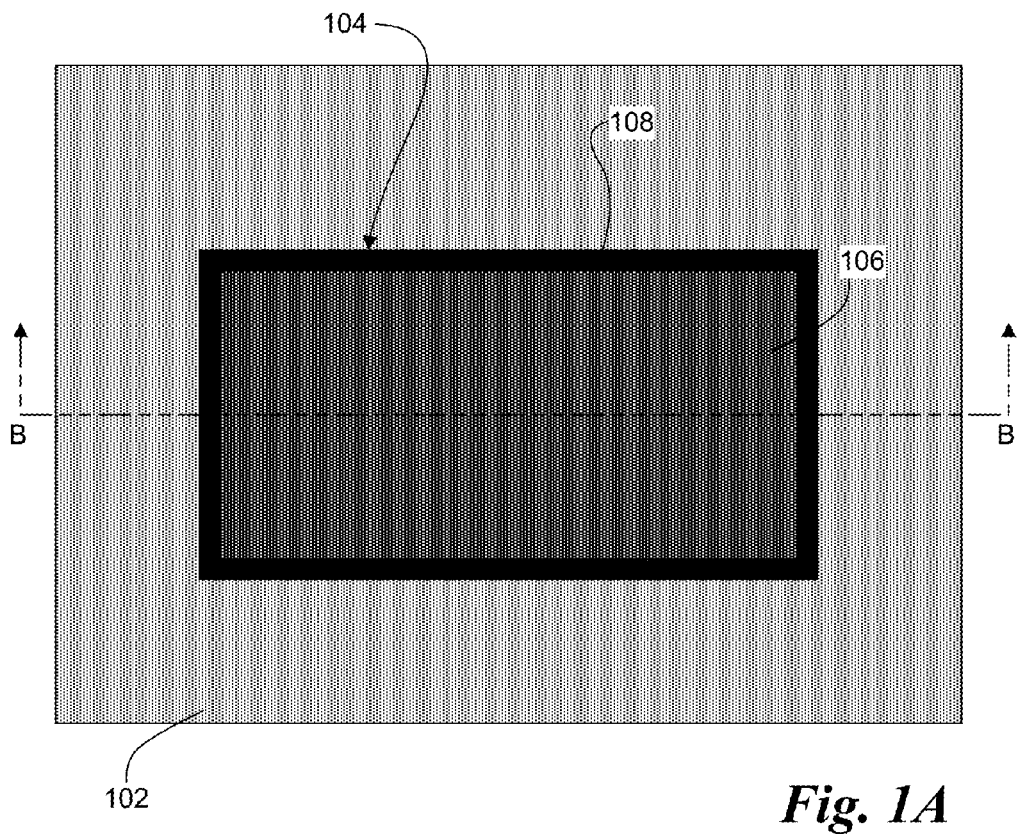
FIGS. 1A-1B are a plan view and a cross-sectional view, respectively, of a display mounted on a diffuse surface.
Figure 1B:
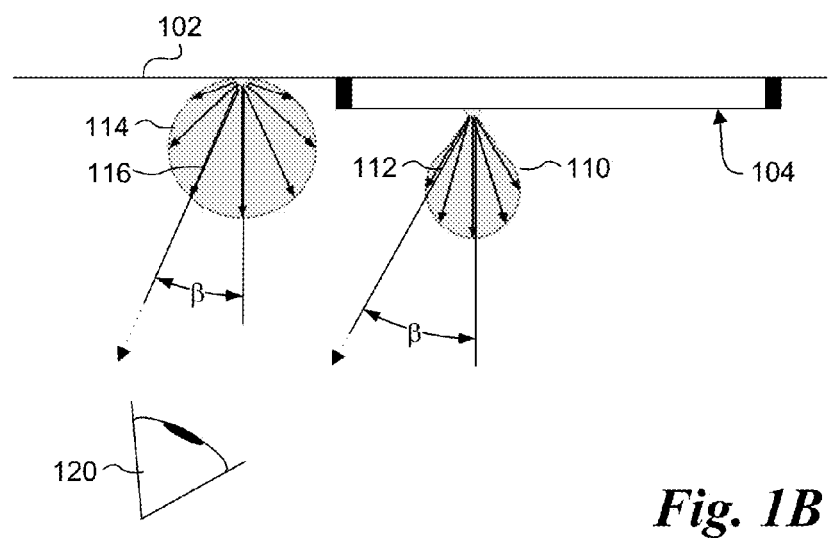

FIGS. 1A-1B illustrate an embodiment of a display 104 mounted on a diffuse surface 102. Display 104 includes a pixel array 106 having a plurality of individual display pixels. In one embodiment the individual display pixels within pixel array 106 can be arrayed in vertical columns and horizontal rows, but in other embodiments they can be arrayed differently. In display 104, pixel array 106 is surrounded by a housing or bezel 108, but other embodiments need not have a housing or bezel. Diffuse surface 102 can be a textured, painted, and/or wallpapered wall in one embodiment, but can be another type of surface in other embodiments. For example, in one embodiment diffuse surface 102 can be another display.

Diffuse surface 102 and individual display pixels within pixel array 106 have different brightness profiles. For diffuse surface 102, a brightness profile 114 relates the brightness of the surface to the angle from which it is viewed. In brightness profile 114 the lengths of arrows 116 emanating from surface 102 represent the brightness of the surface when viewed from viewing angle β by observer 120—the longer the arrow, the brighter the surface looks when viewed from that angle. In brightness profile 114 the brightness of surface 102 is fairly uniform over a wide range of viewing angles β. For a given diffuse surface 102 the reflectivity of the surface (i.e., brightness profile 114) should be known ahead of time, since the brightness profiles of many natural surfaces are known, having been measured previously. But if the profile is not known ahead of time, this is a standard optical measurement that can be performed in a lab or, in some cases, by the end-user. If the brightness profile is not known beforehand and cannot be measured, the brightness profiles of many natural surfaces can be estimated: many have similar angle-brightness functions with simple parameters. A guess for the parameters may be good enough in many cases (such as paper or paint). A user could also tweak the parameters to fit their preferences. For example, the display could be set to a "live-adjust" mode and the user could change the desired viewing-brightness profile to taste.

For the display pixels within pixel array 106, a brightness profile relates the brightness of the display pixel to the angle from which it is viewed, as well as to variables such as the electrical power delivered to the individual display pixel. Individual display pixels in the pixel array 106 have brightness profile 110, in which the length of arrows 112 emanating from the display pixel represent the brightness of the display pixel when viewed at that viewing angle β by observer 120. The brightness profile 110 of the display pixels is different than the brightness profile of surface 102: in contrast to brightness profile 114, in brightness profile 110 the brightness drops off much more significantly as viewing angle β increases. At high viewing angles β, then, pixel array 106 will look dimmer than surface 102.

For any given pixel array, the brightness profile of the pixels can be measured so that the intensity at each viewing angle is known ahead of time; this is a standard optical measurement and accompanies nearly every display datasheet. But if the measurement is not available from the display seller it can be measured in a lab using readily available tools or could be measured by an end-user. For example, the same information could be extracted from a series of photographs or videos of a display at different angles, positions, or both. The brightness profile for most displays is usually the same for each pixel and may be almost identical across displays of the same make/model. Thus, the display's brightness profile data could be measured by a professional and distributed to users at a later date.

Figure 2A:
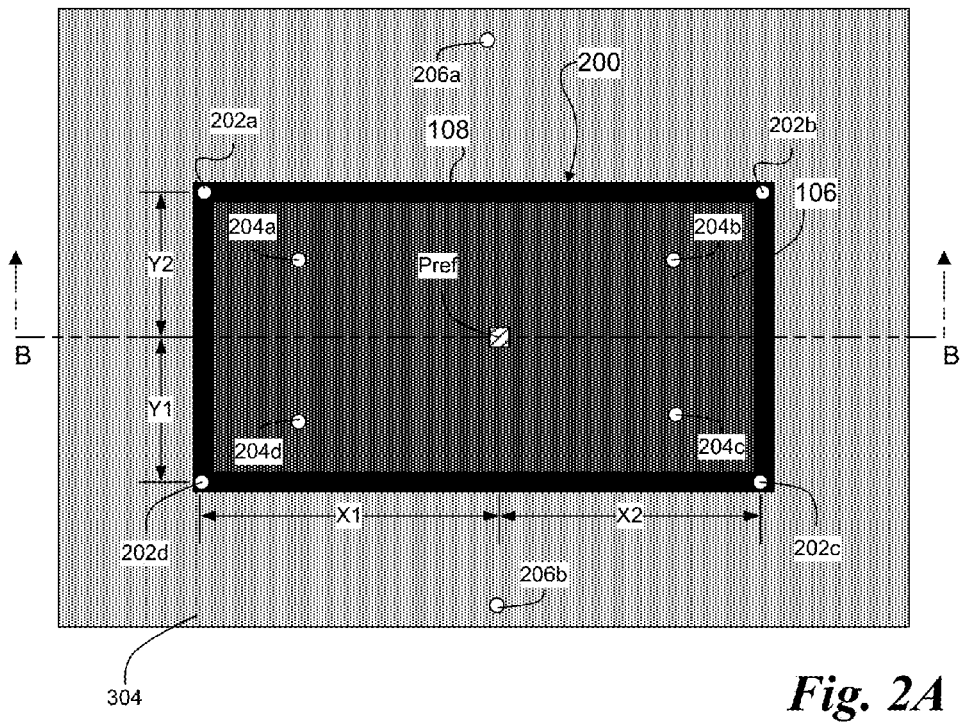
FIGS. 2A-2B are a plan view and a cross-sectional view, respectively, of a display mounted on a diffuse surface.
Figure 2B:
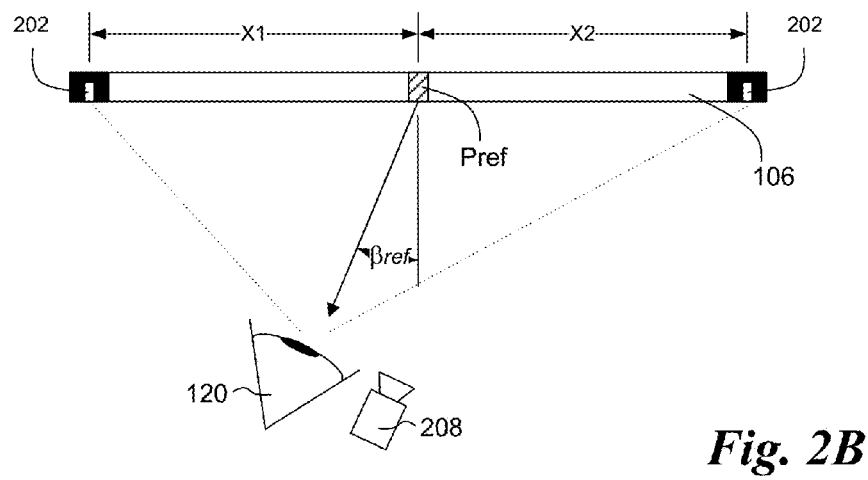

FIGS. 2A-2B illustrate an embodiment of a display 200 in which pixel brightness can be adjusted to substantially match the brightness of diffuse surface 102 surrounding pixel array 106. FIG. 2A is a plan view, FIG. 2B a cross-sectional view. Display 200 includes a pixel array 106 that includes a plurality of individual display pixels, as well as a bezel or housing 108 that surrounds pixel array 106. Display 200 also is coupled to a plurality of sensors that can be used to determine the position and viewing angle of an observer 120 relative to pixel array 106

In one embodiment sensors 202 can be positioned surrounding the pixel array 106, for example in bezel 108. Four sensors 202a-202d are shown, but other embodiments can use less or more sensors. In another embodiment the sensors need not be positioned within the bezel or housing 108; in one embodiment sensors 204 can be positioned within pixel array 106 itself—for example interspersed between pixels in the pixel array or positioned over pixels in the pixel array. Four sensors 204a-204d are shown, but in other embodiments a different number of sensors can be used. In other embodiments the sensors need not be in or on display 200. For example, display 200 can be coupled to sensors 206a-206b positioned on surface 102 apart from the display. In another example they can be coupled to a sensor 208 positioned on or near observer 120; a wearable computing device or heads-up display would be one example of a sensor 208.

Display 200 need not be limited to one kind of sensor positioning, but can include a combination of sensors that are in the pixel array and around the pixel array. In one embodiment sensors 202-208 can be optical (e.g., cameras or image sensors), but in other embodiments they can be other types of sensors such as acoustic sensors using sonic ranging. Still other embodiments can combine optical and acoustic sensors, and could use other or additional methods used to estimate the viewer's position such as asking the observer to wear a special apparatus on their head (such as a hat with markers), etc.

In one possible mode of operation of display 200, a reference pixel Pref is selected within pixel array 106. In one embodiment reference pixel Pref can be a pixel at or near the center of pixel array 106, but in other embodiments reference pixel Pref can be selected differently. Sensors in display 200, which can be any of sensors 202-208 or some combination thereof, are used to sense user 120. Head tracking uses a camera or multiple cameras to locate the position of a viewer's head in 3D space relative to a display. One method involves using a single camera to locate facial features such as eyes and a nose to estimate the 3D displacement. Another method involves using multiple cameras to create a depth map of the viewer, locating the head's 3D position. The sensors (or other head tracking method) and display will need to be referenced together, which is easy if the cameras are built into the display or affixed at known locations. There are a number of ways to calculate the position references if the cameras are not fixed as well. In embodiments that include optical sensors, facial recognition can be used not only to identify the observer's position, but to specifically identify the position of the observer's eyes, so that the viewing angle directly to the observer's eyes can be calculated. Other methods can be used as well.

Based on the output of the sensors, the computation of the observer's position, and distances X1, X2, Y1, and Y2 between the sensors and reference pixel Pref, the viewing angle βref between reference pixel Pref and observer 120 can be calculated. Based on viewing angle βref, the brightness profiles of surface 102 and the individual display pixels can be used to adjust the brightness of the display pixels to match the brightness of diffuse surface 102 when viewed at the same angle βref (see FIG. 3C). In situations where observer 120 is far from display 200, viewing angle β will vary little from one edge of pixel array 106 to the other. In these situations, to save computational resources all display pixels in pixel array 106 can be set to the same brightness as reference pixel Pref.

Figure 3A:
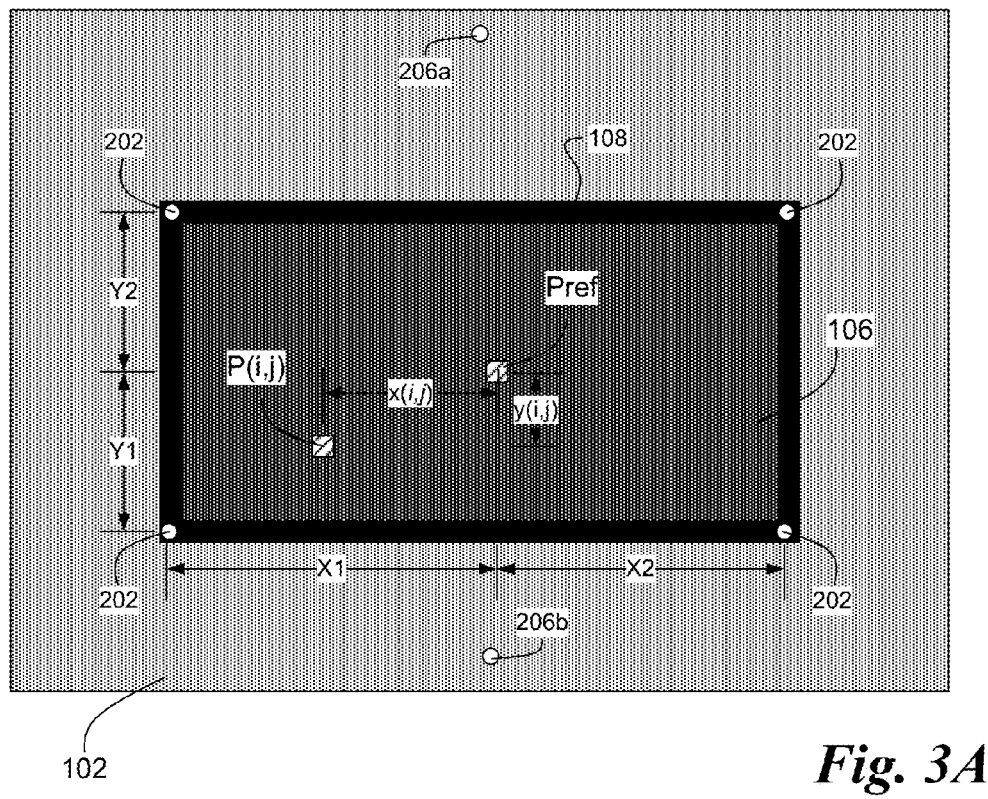
FIGS. 3A-3C are a plan view and a pair of cross-sectional view, respectively, of a display mounted on a diffuse surface.
Figure 3B:
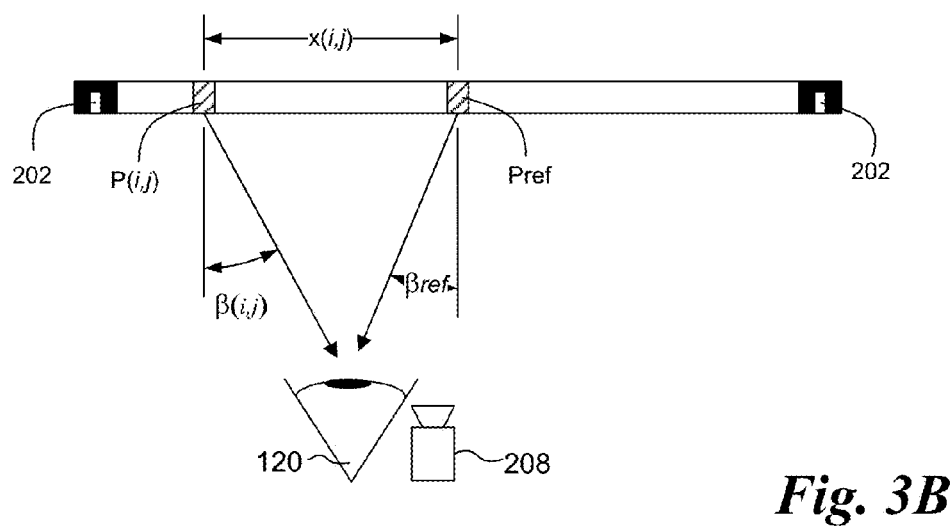
Figure 3C:
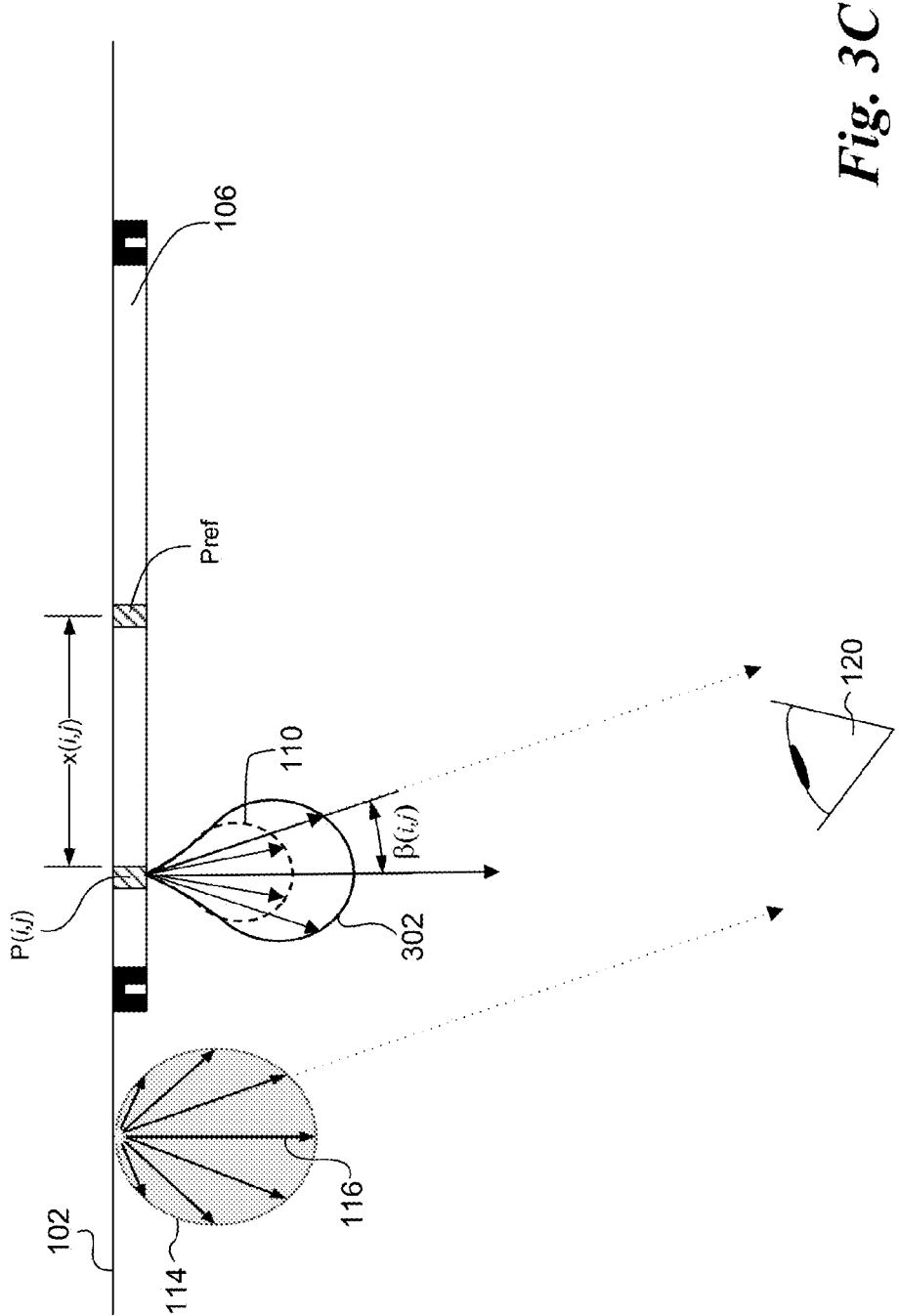

FIGS. 3A-3C illustrate an alternative embodiment of the operation of display 200. Display 200 is as previously described: it includes a pixel array 106 including a plurality of individual display pixels, and in some embodiments a bezel 108 surrounding the pixel array 106. Display 200 can be coupled to any of sensors 202-208, or some combination thereof, that can be used to determine the position angle of an observer 120 with respect to pixel array 106.

In situations where observer is close to display 200, there can be significant viewing angle variation in different parts of pixel array 106. In these situations it can be desirable to adjust the brightness of each display individually instead of setting the brightness of all display pixels equal to the brightness of reference pixel Pref. In these situations the brightness of each display pixel can be based on its individual viewing angle rather than the viewing angle of a reference pixel. In another mode of operation, then, display 200 first determines a viewing angle between a reference pixel Pref and observer 120 as described above. A viewing angle β(i,j) can be computed for each display pixel P(i,j) based on its position (x(i,j), y(i,j)) relative to reference pixel Pref, for which a viewing angle has already been determined. Having determined β(i,j), for each pixel P(i,j) the display pixel brightness profile can be used to adjust the brightness of each pixel P(i,j) so that it substantially matches the brightness of the diffuse surface when viewed at the same β(i,j).

FIG. 3C illustrates adjustment of pixel brightness. As was noted for FIG. 2A, each display pixel P(i,j) has a normal brightness profile 110 and diffuse surface 102 has a brightness profile 114; in both brightness profiles the length of the arrows represents the brightness at a particular viewing angle β. At viewing angle β(i,j), the normal brightness of the display pixels is less than the brightness of diffuse surface 102. But by adjusting the brightness of the pixels, for example by directing more power to the pixels via a higher current or voltage, its brightness profile can be changed from brightness profile 110 to brightness profile 302, in which light at angle β(i,j) has the same brightness as diffuse surface 102 at the same angle β(i,j).

Figure 4A:
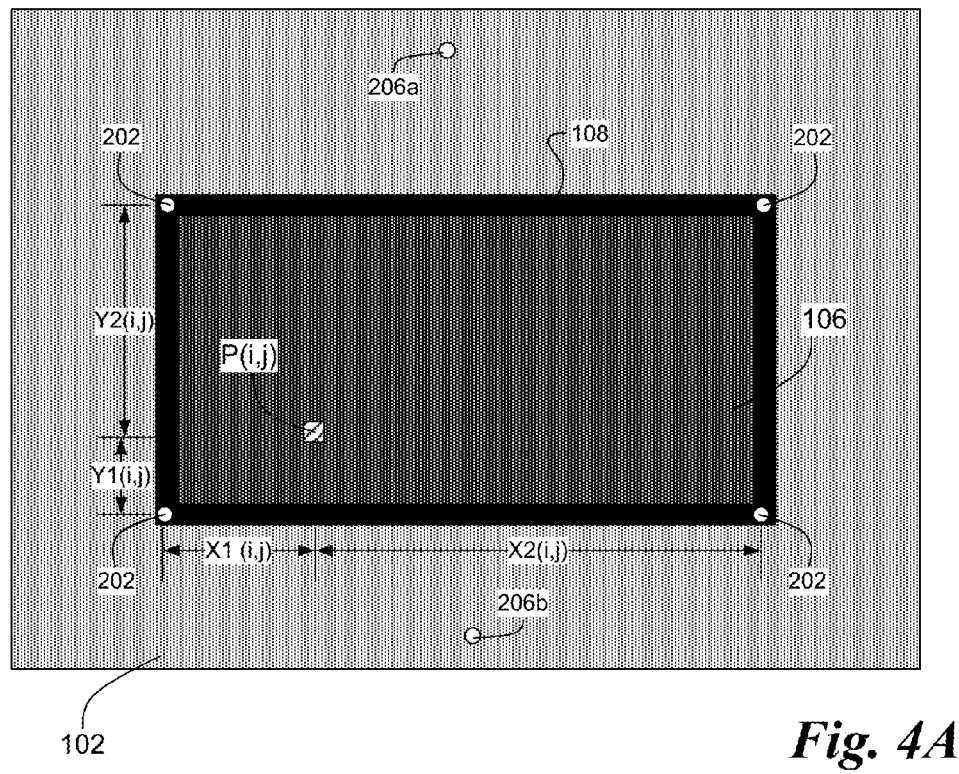
FIGS. 4A-4B are a plan view and a pair of cross-sectional view, respectively, of a display mounted on a diffuse surface.
Figure 4B:
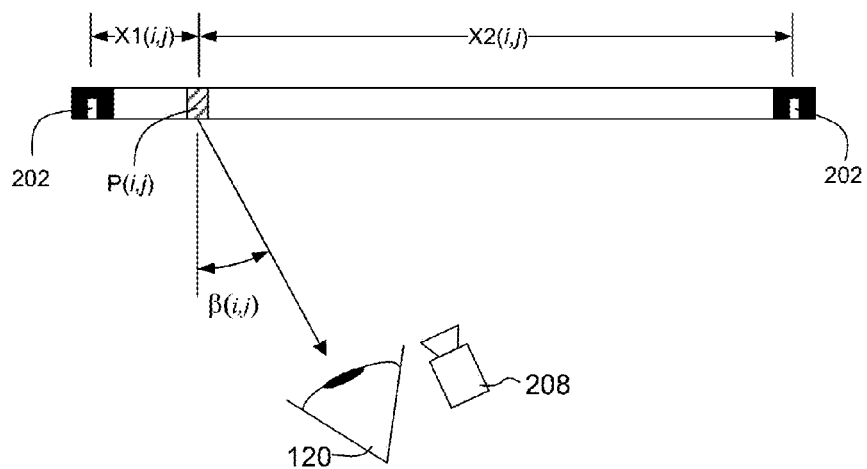

FIGS. 4A-4B illustrate an alternative embodiment of the operation of display 200. Display 200 is as previously described: it includes a pixel array 106 including a plurality of individual display pixels, and in some embodiments a bezel 108 surrounding the pixel array 106. Display 200 can be coupled to any of sensors 202-208, or some combination thereof, that can be used to determine the position angle of an observer 120 with respect to pixel array 106.

In the illustrated mode of operation, rather than determine the location and viewing angle of each individual display pixel based on its location relative to a reference pixel, display 200 determines the viewing angle of each pixel based on its location relative to the sensors. A viewing angle $\beta(i,j)$ can be computed for each display pixel $P(i,j)$ based on distances $X1(i,j)$, $X2(i,j)$, $Y1(i,j)$, and $Y2(i,j)$, between pixel $P(i,j)$ and sensors such as sensors 202. Having determined $\beta(i,j)$ for each pixel $P(i,j)$, the brightness profile for the display pixels in the array can be used to adjust the brightness of each pixel $P(i,j)$ so that it substantially matches the brightness of the diffuse surface when viewed at the same $\beta(i,j)$.

Figure 5:
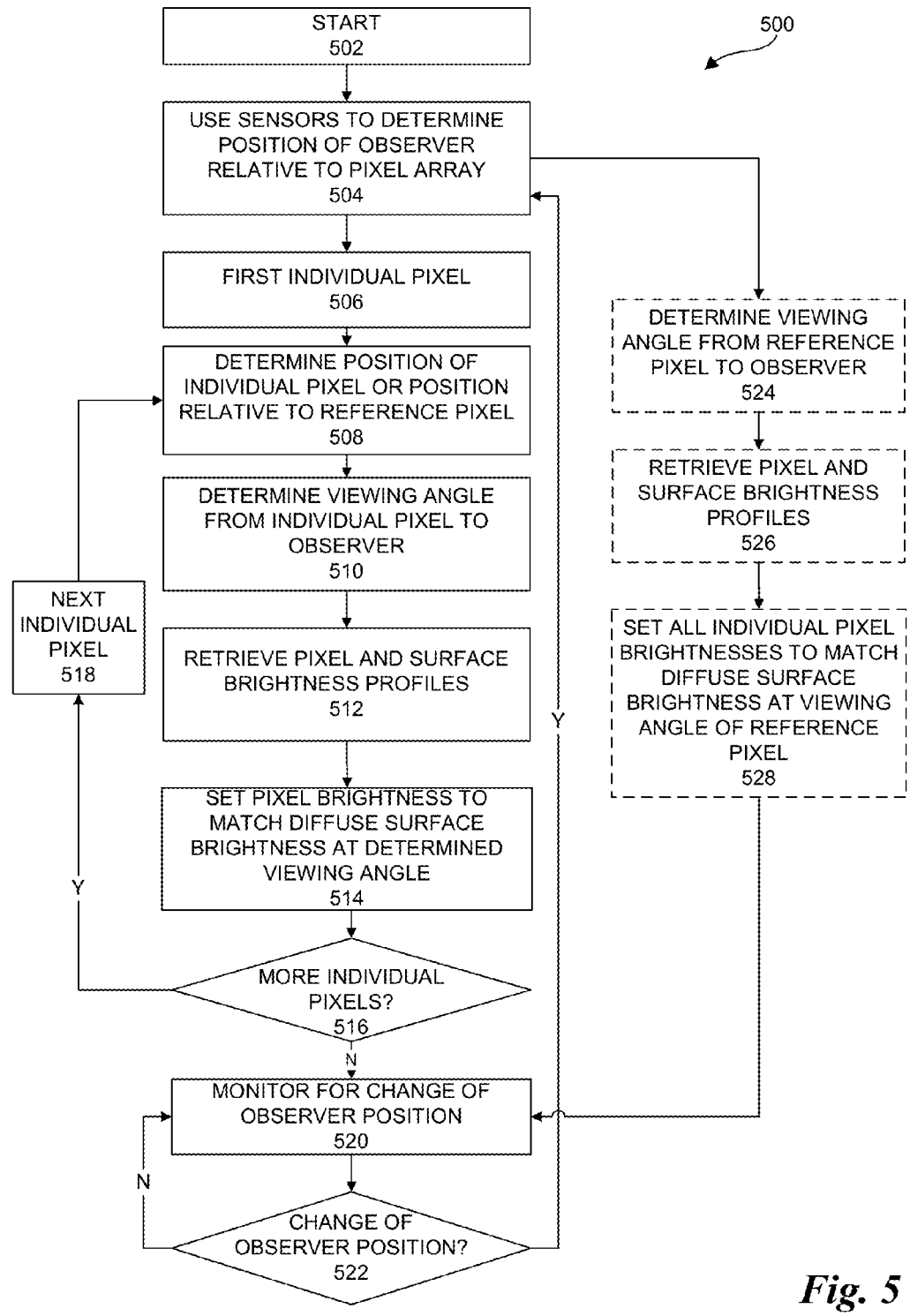
FIG. 5 is a plan view and a cross-sectional view, respectively, of a display mounted on a diffuse surface.

FIG. 5 illustrates an embodiment of a process 500 for adjusting pixel brightness in display 200. At block 504, display 200 uses its sensors to determine the position and viewing angle of an observer relative to pixel array 106. Having determined the position or the viewing angle of the observer, the next block depends on how the display pixel brightness will be adjusted: each pixel can be adjusted separately based on its individual viewing angle (FIGS. 3A-3C, 4A-4B), or the brightness of all pixels in the pixel array can be adjusted based on the viewing angle of a reference pixel (FIGS. 2A-2B).

In an embodiment in which display 200 adjusts the brightness of display pixels based on their individual viewing angles, the process continues to block 506, where it selects the first display pixel for processing. At block 508 it determines the position of the selected pixel relative to the reference pixel Pref or relative to the sensors, and at block 510 it determines a viewing angle from that individual pixel to the observer. Having determined the viewing angle for that particular pixel, at block 512 the process retrieves the brightness profile for the diffuse surface and the brightness profile for the display pixels. At block 514, the process sets the brightness of the selected display pixel so that its brightness substantially matches the brightness of the diffuse surface 102 at the same viewing angle.

At block 516, the process queries where more individual pixels remain to be processed. If at block 516 more pixels remain to be processed, at block 518 the process selects the next display pixel and returns to block 508, where it repeats the process for this display pixel. If at block 516 no display pixels remain for processing, meaning that all display pixels in the pixel array have been processed, the process continues to block 520 where it can use the sensors to monitor for a change of observer position. If at block 522 the sensors detect a change of observer position, the process returns to block 504 and begins the process again. But if block 522 determines that there has been no change in observer position, the process returns to block 520 where it continues to monitor for changes of observer position.

If at block 504 the process will adjust the brightness of all pixels in pixel array 106 based on the viewing angle of the reference pixel, then from block 504 the process continues to block 524 where it determines the viewing angle from the reference pixel to the observer. At block 526 the process retrieves the display pixel brightness profile and the brightness profile for diffuse surface 102, and at block 528 the process sets all the individual display pixel brightness is to substantially match the brightness of the diffuse surface at the determined angle.

The illustrated apparatus and process have several potential advantages. Among other things, the process is dynamic: the screen can be set to simulate any other type of surface, and respond to the viewer's position. The method can also be combined with head tracking applications such as simulating 3D (through motion parallax) or lighting effects rendered into the content itself (such as shiny highlights on objects that respond to the viewer's position). It is also a software-based solution, meaning it can be easily updated if there are improvements. And it relies on straightforward measurements: the required optical measurements are all well-understood measurements with devices manufactured specifically to provide that type of measurement. Similarly, measurements performed by an end-user can be surprisingly straightforward using photographs or videos.

The above description of illustrated embodiments of the invention, including what is described in the abstract, is not intended to be exhaustive or to limit the invention to the precise forms disclosed. Although specific embodiments and examples are described for illustrative purposes, many equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A process comprising:
    determining a position of an observer relative to a pixel array positioned on a diffuse surface, the pixel array comprising a plurality of individual display pixels;
    determining the observer's viewing angle relative to the pixel array based on the position of the observer relative to the pixel array;
    adjusting a brightness of the pixel array so that the brightness of the pixel array when viewed at the observer's viewing angle matches the brightness of the diffuse surface when viewed at the observer's viewing angle.

2. The process of claim 1 wherein determining the position of the observer relative to the pixel array comprises:
    sensing the observer using one or more sensors coupled to the pixel array;
    computing the observer's position relative to the pixel array based on the outputs of the one or more sensors.

3. The process of claim 2 wherein the one or more sensors comprise optical sensors, acoustic sensors, or a combination of optical and acoustic sensors.

4. The process of claim 2 wherein determining the position of the observer relative to the pixel array further comprises determining the position of at least one of the observer's eyes relative to the pixel array.

5. The process of claim 1 wherein determining the observer's viewing angle comprises determining the viewing angle from a reference pixel to the observer, the reference pixel selected from among the plurality of individual display pixels.

6. The process of claim 5 wherein adjusting the brightness of the pixel array comprises adjusting the brightness of all individual display pixels based on the observer's viewing angle from the reference pixel.

7. The process of claim 1 wherein adjusting the brightness of the pixel array comprises:
    determining the observer's viewing angle for each individual display pixel in the pixel array; and
    adjusting the brightness of each individual display pixel based on the observer's viewing angle for that particular pixel.

8. The process of claim 7 wherein determining the observer's viewing angle for each individual display pixel comprises computing a viewing angle for each individual display pixel based on the position of each individual display pixel relative to a reference pixel for which the observer's viewing angle has previously been determined.

9. The process of claim 1 wherein adjusting the brightness of the pixel array comprises:
retrieving a brightness profile for the diffuse surface, wherein the brightness profile relates the brightness of the diffuse surface to viewing angle;
retrieving a brightness profile for the pixel array, wherein the brightness profile relates the brightness of the display pixels to viewing angle; and
adjusting the brightness of each individual display pixel based on its brightness profile until its brightness at the observer's viewing angle matches the brightness of the diffuse surface at the observer's viewing angle as determined from the brightness profile of the diffuse surface.

10. The process of claim 1 wherein matching the brightness of the pixel array when viewed at the observer's viewing angle and the brightness of the diffuse surface when viewed at the observer's viewing angle comprises reducing the difference between the brightness of the pixel array and the brightness of the diffuse surface.

11. An apparatus comprising:
a pixel array positioned on a diffuse surface, the pixel array comprising a plurality of individual display pixels;
one or more sensors positioned in, on, or around the pixel array to determine the position of an observer relative to the pixel array;
circuitry and logic coupled to the one or more sensors and to the pixel array, wherein the logic include instructions that, when executed, cause the circuitry to:
determine a position of an observer relative to a pixel array positioned on a diffuse surface, the pixel array comprising a plurality of individual display pixels;
determine the observer's viewing angle relative to the pixel array based on the position of the observer relative to the pixel array;
adjust a brightness of the pixel array so that the brightness of the pixel array when viewed at the observer's viewing angle matches the brightness of the diffuse surface when viewed at the observer's viewing angle.

12. The apparatus of claim 11 wherein the instructions to determine the position of the observer relative to the pixel array comprise instructions to:
sense the observer using the one or more sensors;
compute the observer's position relative to the pixel array based on the outputs of the one or more sensors.

13. The apparatus of claim 12 wherein the one or more sensors comprise optical sensors, acoustic sensors, or a combination of optical and acoustic sensors.

14. The apparatus of claim 12 wherein the instructions to determine the position of the observer relative to the pixel array comprise instructions to determine the position of at least one of the observer's eyes relative to the pixel array.

15. The apparatus of claim 11 wherein the instructions to determine the observer's viewing angle include instructions to determine the viewing angle from a reference pixel to the observer, the reference pixel selected from among the plurality of individual display pixels.

16. The apparatus of claim 15 wherein the instructions to adjust the brightness of the pixel array comprise instructions to adjust the brightness of all individual display pixels based on the observer's viewing angle from the reference pixel.

17. The apparatus of claim 11 wherein the instructions to adjust the brightness of the pixel array comprise instructions to:
determine the observer's viewing angle for each individual display pixel in the pixel array; and
adjust the brightness of each individual display pixel based on the observer's viewing angle for that particular pixel.

18. The apparatus of claim 17 wherein instructions to determine the observer's viewing angle for each individual display pixel include instructions to compute a viewing angle for each individual display pixel based on the position of each individual display pixel relative to a reference pixel for which the observer's viewing angle has previously been determined.

19. The apparatus of claim 11 wherein the instructions to adjust the brightness of the pixel array comprise instructions to:
retrieve a brightness profile for the diffuse surface, wherein the brightness profile relates the brightness of the diffuse surface to viewing angle;
retrieve a brightness profile for the pixel array, wherein the brightness profile relates the brightness of the display pixels to viewing angle; and
adjust the brightness of each individual display pixel based on its brightness profile until its brightness at the observer's viewing angle matches the brightness of the diffuse surface at the observer's viewing angle as determined from the brightness profile of the diffuse surface.

20. The apparatus of claim 11 wherein matching the brightness of the pixel array when viewed at the observer's viewing angle and the brightness of the diffuse surface when viewed at the observer's viewing angle comprises reducing the difference between the brightness of the pixel array and the brightness of the diffuse surface.

* * * * *